United States Patent Office 3,172,036
Patented Mar. 2, 1965

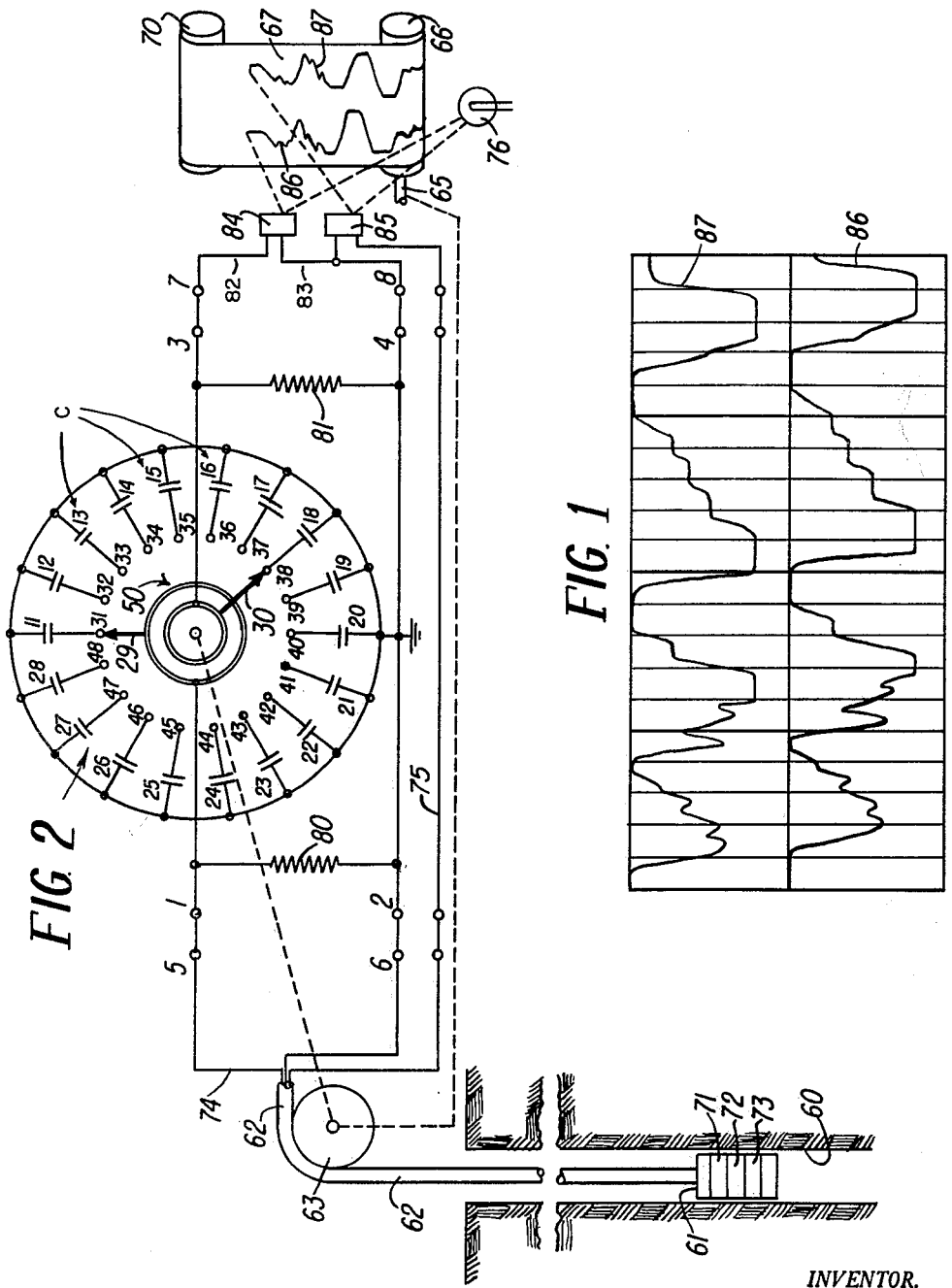

3,172,036
METHOD AND APPARATUS INCLUDING CAPACITOR CIRCUIT STORAGE MEANS FOR THE DELAYED RECORDING OF BOREHOLE MEASUREMENTS
Henry C. Waters, Houston, Tex., assignor, by mesne assignments, to PGAC Development Company, Houston, Tex., a corporation of Texas
Filed Nov. 15, 1960, Ser. No. 69,413
4 Claims. (Cl. 324—1)

This invention relates in general to a method and apparatus for the delayed recording of measurements and more particularly to measurements of various conditions existing laterally of a borehole as a measuring instrument traverses a borehole.

In the recording of experimental data or technical measurements the requirement is frequently made that measurements obtained at successive time intervals on one object be recorded in such manner that the fact that they belong together or their correlation is immediately evident. These measurements are commonly taken in well logging by means of an arrangement in which the measuring devices are spaced, in series, on a carrier which traverses the object to be examined. In this manner one obtains simultaneously on an associated recording instrument, a galvanometer, for example, recordings for values for points on the object, which are spaced apart at a distance corresponding to the distances of the spacing between the measuring devices on the carrier. In other words, measurements are obtained which apply to one specific measured zone but these are recorded by the galvanometer in a timed sequence. In a continuous recording of measurements which correspond to the movement of the carrier across the body to be examined, a recording camera will record curves from the galvanometer, which in accordance with the spacing of the measuring devices on the carrier will be spaced with respect to each other. Therefore, the recorded measurements which actually relate to one specific point are not recorded in a straight line perpendicular to the direction of the movement of the recording medium. This complicates the correlation and evaluation of the obtained measured records.

It is accordingly the principal object of the present invention, to provide a new method according to which a device is designed and constructed that permits storage of the obtained measurements. The stored information can be recovered from the storage arrangement with a timing delay. The stored information is after a delay transmitted to the inidcating and recording instruments (particularly galvanometers). By interposing this aforesaid interval of delay in the transmission of the data through their storage, all values obtained for the same location will then be recorded on a straight line which runs perpendicular to the direction of movement of the recording means.

Others have previously attempted to accomplish the same result. In well logging this has been done by constructing the measuring cables in such manner that an electronic assembly consisting of an amplifier with a recording head, an endless magnetic tape and a pick-up with an amplifier was interposed between each measuring means or probe and the recording instrument or galvanometer. By adjusting or shifting of the pick-ups on the magnetic tape in such manner that their spatial relationship with respect to the recording heads corresponded to the spacing between the different probes on the carrier, a timing delay in the transmission of the recorded values to the recording medium was accomplished. Thus all values for one single location were recorded simultaneously. Aside from the need for expensive and complicated electronic circuitry with its inherent possibilities for error, this arrangement has many additional disadvantages. For example, the characteristic noise-level associated with the magnetic tape of measurement was too high for well logging applications. Impurities of and lack of homogeneity in the active layer of the magnetic tape, as well as changes in the running speeds of the tape (when it first records at one speed, but transmits the recorded data later at another speed) often misrepresents the magnitude of the measured value that was obtained. All of these disadvantages are overcome in the method which is the object of the present invention.

In accordance with the present invention, the measured values obtained from each separate cable of the measuring instrument, are transmitted in a rapid, timed sequence. A condenser circuit with a very small time constant receives the signals and transmits them to a series of condensers. In this instance the time constant of the condenser circuit must be so small, that the circuit will charge almost the entire applied measurement voltage into the respective condensers. In unison with the charging, the stored measurement voltage is transmitted over a second circuit which has a large time-constant (that means it is withdrawn from the condensers in the same time sequence) and supplied to the indicating instrument, for example, a galvanometer. The withdrawal of the stored measuring voltage, while synchronous with the condenser charging operation is nevertheless shifted in timing phase so that it compensates for the specific charging speed of the recording instrument as well as for the spacing of the probes on the carrier. This method has been found to provide a smooth, continuous, uninterrupted recording of measurement values even when only a relatively small number of condensers are provided for each measuring cable.

Referring now to the accompanying drawing, FIG. 1 shows a logging record. On one side of the record the measured values have been recorded directly. On the other side, the recorded measured values have been transmitted over a time delay mechanism in accordance with the present invention. It will be noted that there exists no observable difference between the amplitudes obtained either with or without the interposition of the time delay mechanism.

FIG. 2 is a schematic representation, illustrating a borehole which penetrates the strata of the earth and a preferred form of the present invention.

Referring now more particularly to FIG. 2 of the drawing, there is schematically illustrated a borehole 60, penetrating the formations to be explored. For the purpose of exploring the formations along the borehole there is provided exploratory apparatus comprising a subsurface tool or carrier 61 which is lowered into the borehole 60 by means of a cable 62 including as a part thereof suitable insulated conductors. The cable 62 has a length somewhat in excess of the depth of the borehole to be explored and is normally wound on a drum 63 to lower the exploring apparatus into the borehole 60 and may be rewound upon the drum 63 to raise the exploring apparatus in accord with conventional practice.

In order to determine the depth of the exploratory apparatus within the borehole at any time there may be providing a measuring wheel (not shown) engaging the cable 62 and mounted on shaft (not shown), and rotation of the wheel and shaft may be transmitted through suitable gearing to a shaft 65 which is drivingly connected to a take-up spool 66 for moving a photographic film record medium 67 from a feed spool 70 to the take-up spool 66.

The carrier 61 of the exploratory apparatus illustrated may be, for example, of the type for recording a gamma ray curve simultaneously with a neutron curve and be divided into a number of sections including a gamma ray counter 71, power and signal translating circuits 72, and a neutron counter 73. In the illustrated structure the gamma ray counter 71 may be located a number of feet above the neutron counter 73. As a result of this vertical displacement in the borehole, the signals received at the surface at any particular time are not related to a common depth reference. In conventional practice the galvanometers generally project light beams on a common horizontal plane. If the curves are thus recorded on a film or chart in this manner the curves are not easily correlatable because of the difference in depth. In order to properly align the curves so that they are easily correlatable on a common horizontal line, it is thus desirable to store the signal from a first measuring device to reach a given depth reference and then play it back for recording simultaneously with the signal from a second measuring device to reach that depth level after the carrier 61 has moved a distance in the borehole equal to the spacing of the measuring devices or counters.

The structure illustrated in FIG. 2 accomplishes the desired result by means including a suitable switching means, for example, a rotary stepping switch 50 similar to those employed in rotary switch telephone dialing systems. The stepping switch 50 operates and moves in unison with the movement of the measuring and recording means consisting of the exploratory apparatus of carrier 1 and the film 67. The individual contacts 31 to 48 inclusive of switch 50 are linked to a series of condensers individually designated 11 to 28 inclusive. The terminals of these condensers are linked to each other as shown in FIG. 2 and connected to an input terminal 2 and an output terminal 4. One brush contact or wiper of the stepping switch 50 contacts an input terminal the other brush contact or wiper 30 is linked to an output terminal 3. The brush contacts 29 and 30 are displaced from each other by the desired number of positions. In the illustrated structure, brush contact 30 is seven positions away from brush contact 29 when the brush contacts are rotating in a counter-clockwise direction. The brush contacts on the switch 50 are driven by suitable means in step with the movement of the cable 62 in the borehole in a counter-clockwise rotation. A resistor 80 is placed across input terminals 1 and 2. The signal from the gamma ray counter 71 in carrier 61 is obtained by means of a line 74, terminals 5 and 6 and input terminals 1 and 2 and impressed across the condensers from 11 to 28 as the brush contact 29 makes one rotation. The charging time for the condensers which is $R_{80}C$ must be fast enough to allow the condensers to charge to the peak value of the measured signal for the fastest rotational speed of the brush contact. Each condenser maintains its charge until seven steps later when the voltage stored on it is impressed across an output resistor 81. The time constant for the discharge circuit which is $R_{81}C$ is made so large that no perceptible drop in voltage takes place for the maximum dwell time (slowest possible rotation). In the illustrated embodiment it is clear that if the switch or rotating device is designed to move one position for each six inches of borehole travel, the signal appearing across resistor 81 will be delayed by 3.5 feet of carrier travel. If greater delays in feet are desired, it can be accomplished in either of two ways, (1) by increasing the footage increment between steps by reducing the speed of switch rotation or, (2) increasing the number of contacts between brush contacts 29 and 30. Conversely, if a lesser delay in feet is desired, this can be accomplished in either of two ways, (1) by decreasing the footage increments between steps increasing speed of switch rotation, or (2) by decreasing the number of contacts between brush contacts 29 and 30.

From the foregoing, it can be seen that the input time constant which is a product of resistance 80 and C must be many times smaller than the output time constant which is the product of resistance 81 and C. This means that resistance 81 must be many times greater than resistance 80. No loss in voltage is experienced since the same voltage which appears across the resistance 80 subsequently appears across the resistance 81. However, the percent of power transferable through the device is equal to one hundred times resistance 80 divided by resistance 81.

In the preceding discussion of both the time constants and the power losses in the arrangement of this invention, only the values of resistance 80 and 81 have been considered, from which it follows that the values of the internal resistances of both the input signal generator of the subsurface tool 61 and of galvanometer 84 were assumed to be infinitely large. Considerations based on this assumption are adequate for practical purposes, however from a strictly technical standpoint, the actual input resistance is more properly stated as $$\frac{R_{80} \times R_{gen}}{R_{80} + R_{gen}}$$

where $R_{gen}$ is the internal resistance of the direct current generator of the subsurface tool 61. Thus, the input time constant becomes $$\frac{R_{80} \times R_{gen}}{R_{80} + R_{gen}} \times C$$

When $R_{gen}$ is very large in comparison to $R_{80}$, the value of the input resistance approaches $R_{80}$, and the input time constant approaches $R_{80}C$ as a limit.

Similarly, since galvanometer 84 is in parallel with $R_{81}$, the total output resistance is $$\frac{R_{81} \times R_{gal}}{R_{81} + R_{gal}}$$

where $R_{gal}$ is the resistance of the galvanometer 84. The output time constant thus becomes $$\frac{R_{81} \times R_{gal}}{R_{81} + R_{gal}} \times C$$

and when the galvanometer resistance $R_{gal}$ is many times larger than $R_{81}$, then the output time constant approaches $R_{81}C$ as a limit. In any case, the total effective input resistance $$\frac{R_{80} \times R_{gen}}{R_{80} + R_{gen}}$$

must be many times smaller than the total effective output resistance $$\frac{R_{81} \times R_{gal}}{R_{81} + R_{gal}}$$

Like theoretical considerations also apply to the power loss in the system, and since the effective output resistance is much greater than the effective input resistance, the power loss is substantial. However, it can be easily regained by applying a properly designed amplifier of conventional type across the output terminals 3 and 4, which, in turn, are connected through leads 82–83 to the galvanometer coil 84.

The signal from counter 73 may then be directly obtained from carrier 61 by means of a line 75 connected to a galvanometer coil 85. The galvanometer coils may have attached thereto suitable mirrors in a manner well known to those skilled in the art and are adapted to reflect beams of light derived from a source 76, thereby effectively producing on the sensitive film 67 a record comprising two traces or curves 86 and 87, representing the variations of the voltage applied to the galvanometer coils 84 and 85.

It is thus apparent that the present invention provides means to record curves relating to a selected common depth reference side by side on a common horizontal line on a record medium even though the associated measuring devices are not at the same physical location on the carrier or subsurface tool.

It will be understood that the advantages of the invention could also be obtained in substantially the same manner if embodied in a sub-surface tool employing probes or electrodes as measuring devices instead of the illustrated gamma ray and neutron counters.

Instead of a switch with two brush contacts one may also employ two switches with one brush contact each. In this case the required contact between the two series of contacts can be maintained by flexible conductors.

It is also possible to provide the individual contacts in each switch series with ring-shaped plug receptacles and the desired timing delay is then obtained by switching the transposed plugs into circular contacts so that they are not one above the other.

Having described a preferred embodiment of my invention, I claim:

1. In apparatus for logging the formations adjacent a borehole comprising a sub-surface tool for traversing the borehole at varying speeds, first measuring means on said tool for developing a first signal representative of the magnitude of a first formation characteristic at a selected depth level, second measuring means on said tool for developing a second signal representative of the magnitude of a second formation characteristic at said selected depth level, said first measuring means being spaced apart from said second measuring means along the longitudinal axis of the borehole when said tool is in the borehole in logging position, recording means including a movable record medium, and means for simultaneously and separately recording the magnitudes of the respective formation characteristic signals developed by said first and said second measuring means side by side in correlation at common depth references on the record medium, including charge storage means comprising a circuit including a plurality of spaced apart condensers having individual contacts, and stepping switch means including first and second contact brushes movable in unison into engagement with respective ones of said condenser contacts at speeds varying in step with movement of the sub-surface tool through the borehole, said first and said second contact brushes being spaced apart so as to respectively engage in sequence condenser contacts spaced in proportion to the spacing between said first and said second measuring means, said first contact brush connecting said first measuring means to one of said condensers by engaging its contact for a first time interval related to the speed of the sub-surface tool through the borehole during said first time interval, and said second contact brush connecting said recording means to said one condenser contact for a second time interval initiated approximately when said sub-surface tool has traversed a distance through the borehole equal to the spacing between said first and said second measuring means, said second time interval having a duration related to the speed of the tool through the borehole during said second time interval, and means for concurrently connecting said second measuring means to said recording means so as to record the magnitudes of said first and said second formation characteristic signals for said selected depth level side by side on the record medium on a common line perpendicular to the direction of movement of the record medium.

2. In apparatus as claimed in claim 1, in which said charge storage means circuit includes resistances having values such that the input resistance of said charge storage means circuit is relatively small in comparison to its output resistance whereby said first signal is recorded on said record medium at substantially its original amplitude in spite of variations in the speed of the sub-surface tool as it moves through the borehole resulting in differences in the duration of said first and said second time intervals.

3. In apparatus for logging the formations adjacent a borehole, a sub-surface tool adapted for movement through a borehole at varying speeds to suit borehole conditions, first and second measuring devices on said tool in spaced relation along its axis for respectively measuring first and second formation characteristics and for developing first and second electrical potential signals representing the magnitudes of said characteristics, recording means including a record medium, and means for correlating said first and second signals by recording them side by side in line at common depth references on the record medium comprising a stepping switch including a series of contacts on its periphery and first and second spaced brushes arranged to engage said contacts at speeds varying in step with the movement of the tool through the borehole, a condenser connected to each contact, means including a first circuit for initiating a timing interval by connecting a first electrical potential signal representative of said first characterstic for a selected depth level to said first brush to charge the condenser connected to the contact engaged at that time by said first brush, a second circuit including responsive means energized at a predetermined time after initiation of said timing interval determined by the speed of the sub-surface tool through the borehole and the spacing of the brushes for impressing signals on a record medium, said responsive means being energized by the charge of said charged condenser on engagement of the contact connected thereto by said second brush thereby to impress said first electrical potential signal on the record medium, and means for recording said second electrical potential signal for the selected depth level on said record medium concurrently with the recording of said first electrical potential signal, said first circuit being a time constant which is relatively small compared to that of said second circuit whereby said first electrical potential signal may be recorded on said record medium at substantially full amplitude.

4. In the method of logging a borehole with a sub-surface tool which traverses the borehole at varying speeds, said tool having a first measuring means, and a second measuring means spaced apart along the longitudinal axis of the borehole, the steps of measuring a first characteristic of a formation adjacent the borehole at a selected depth level by said first measuring means, developing a first signal proportional to the magnitude of said first characteristic, transmitting said first signal to a condenser for storage over a circuit having a small time constant, making a measurement of a second characteristic of the formation adjacent the borehole at said selected depth level by said second measuring means subsequent to the measurement of said first characteristic, developing a second signal representative of said second characteristic, discharging said condenser to a record medium over a circuit having a large time constant after a time interval of a duration related to the speed said sub-surface tool is traversing said borehole during said time interval, and simultaneously recording said first and second signals in side by side relationship on a record medium at the same depth reference on the record medium, said depth reference corresponding to the selected depth level in the borehole at which said first and said second characteristic measurements are obtained, with all of said steps being synchronized with the varying speed of said sub-surface tool as it traverses the borehole during said steps.

References Cited in the file of this patent
UNITED STATES PATENTS

| | | |
|---|---|---|
| 2,373,247 | Jones et al. | Apr. 10, 1945 |
| 2,436,503 | Cleveland | Feb. 24, 1948 |
| 2,952,839 | Capanna | Sept. 13, 1960 |